Sept. 5, 1933.  W. A. RIDDELL  1,925,567
PHOTOGRAPHIC SHUTTER
Filed Nov. 4, 1932  2 Sheets-Sheet 1

Inventor:
William A. Riddell,

Sept. 5, 1933.    W. A. RIDDELL    1,925,567
PHOTOGRAPHIC SHUTTER
Filed Nov. 4, 1932    2 Sheets-Sheet 2
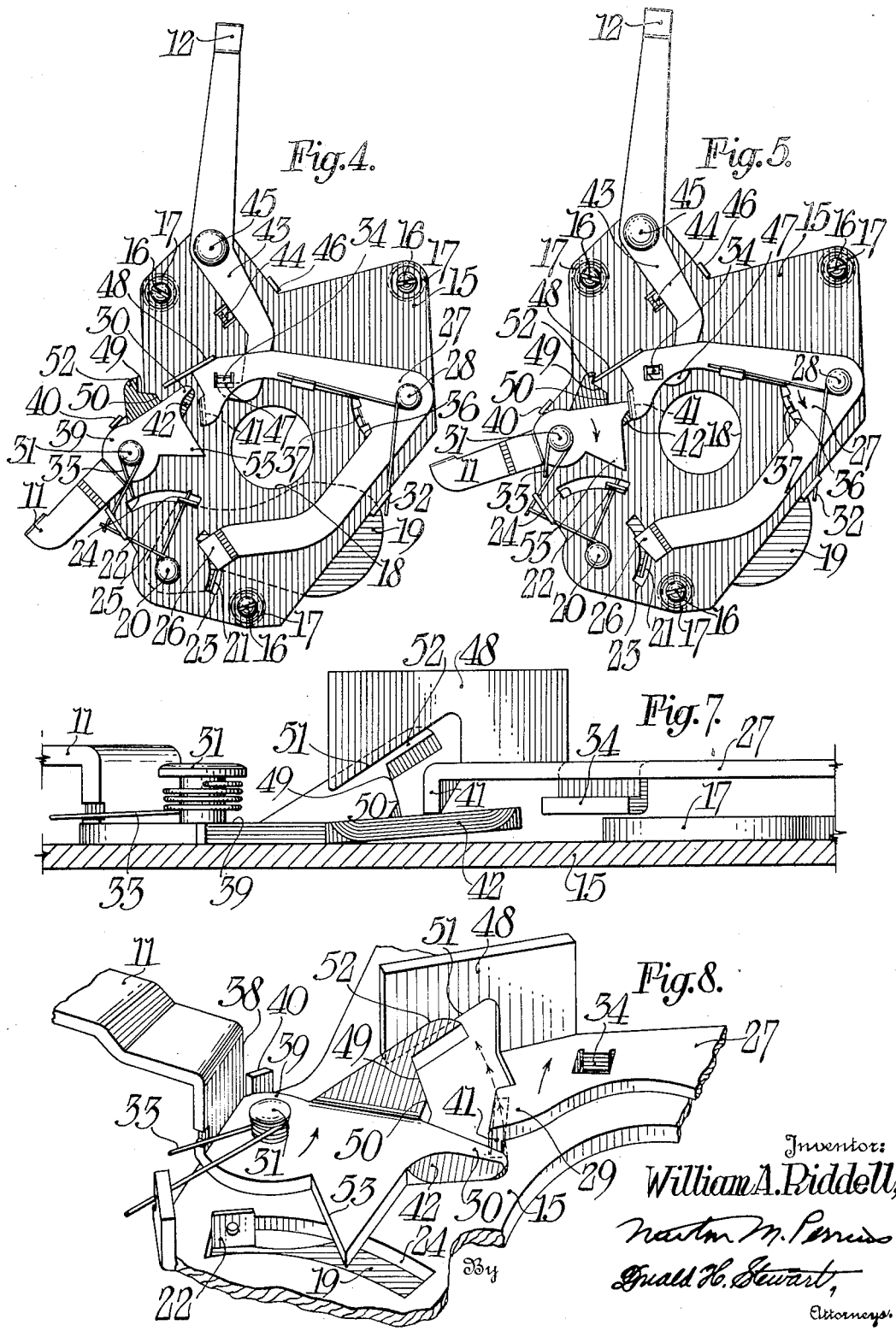
Inventor:
William A. Riddell,
By
Attorneys.

Patented Sept. 5, 1933

1,925,567

UNITED STATES PATENT OFFICE 1,925,567

PHOTOGRAPHIC SHUTTER

William A. Riddell, Rochester, N. Y., assignor to Eastman Kodak Company, Rochester, N. Y., a corporation of New York Application November 4, 1932. Serial No. 641,174

20 Claims. (Cl. 95—59)

This invention relates to photography and more particularly to photographic shutters for cameras. One object of my invention is to provide a photographic shutter which is simple in construction, inexpensive to manufacture and easy to assemble. Another object of my invention is to provide a shutter with which time and instantaneous exposures can be obtained. Another object of my invention is to provide a shutter which consists of but few moving parts. Another object of my invention is to provide a shutter which is adapted for use on different types of cameras. Still another object of my invention is to provide a shutter having a series of moving parts each of which is normally held out of contact in a position of rest by springs acting on the respective parts. A still further object of my invention is to provide a shutter with a simplified form of timing mechanism, and other objects will appear from the following specification, the novel features being particularly pointed out in the claims at the end thereof.

Coming now to the drawings wherein like reference characters denote like parts throughout;

Figs. 3, 4 and 5 are plan views of the shutter plate removed from the camera and with the parts in different relative positions;

Fig. 6 is an enlarged fragmentary detail partially in section on line 6—6 of Fig. 3;

Fig. 7 is an enlarged detail showing in elevation the cooperating parts of the trigger and master member; and Fig. 8 is an enlarged fragmentary view of parts of the trigger and master member.

Figure 1:
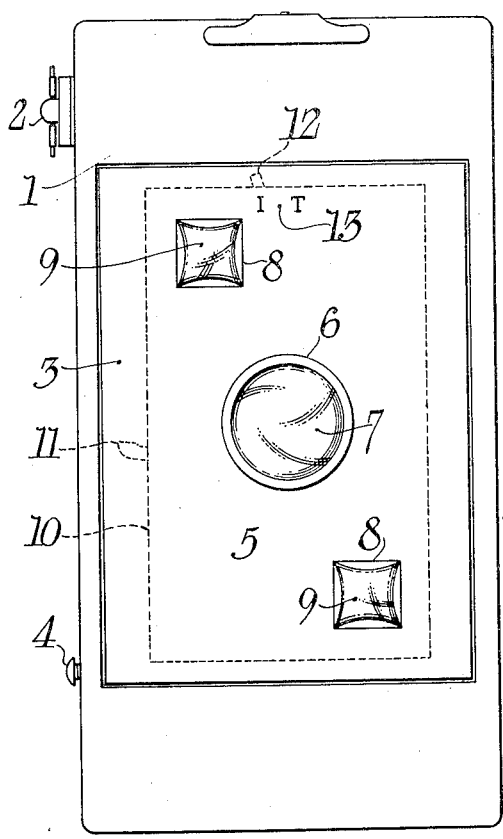
Fig. 1 is a front elevation of a camera equipped with a shutter constructed in accordance with and embodying a preferred form of my invention.

In photographic cameras it is necessary to provide a shutter which will give the so-called instantaneous exposure—that is an exposure of relative short duration, often about 1/25 second—and a time exposure which is an exposure that can be prolonged for making exposures in dull light or interiors.

In accordance with a preferred embodiment of my invention I provide a shutter which is suitable for a compact folding camera designated broadly as 1 which may be provided with the usual winding key 2 and camera front 3. This front may be opened or separated from the camera body by pressing the latch releasing member 4.

The camera shutter is preferably concealed beneath a cover plate 5 on the camera front 3 and this cover plate is provided with an opening 6 for the camera objective 7 and two similar openings 8 for the camera finder lenses 9.

The shutter is preferably mounted upon a shutter block 10 which is concealed by the front plate 5 and a trigger 11 extends behind the front plate in a position to make an exposure. At the top of the front plate 5 and lying behind it there is a second lever 12 adapted to be moved so that the shutter parts will be positioned for an instantaneous exposure or a time exposure in accordance with the position of lever 12 relative to the scale diagrammatically shown in Fig. 1 at 13.

Figure 2:
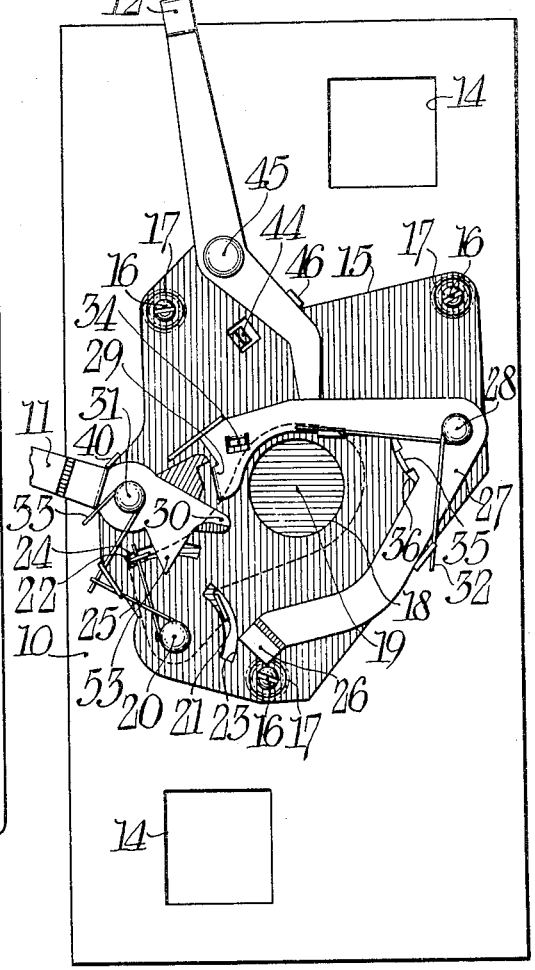
Fig. 2 is an enlarged plan view of the shutter block removed from the camera shown in Fig. 1 and with the cover plate removed.

As best shown in Fig. 2 the shutter block 10 is provided with a pair of openings 14 which openings may receive the finder elements lying behind the finder lenses 9. The shutter block 10 may be conveniently made of a relatively thin wooden block in inexpensive cameras and this block may support a base plate 15 which may be attached to the shutter block 10 by means of a plurality of screws 16. These screws pass through embossed areas 17 which space the base plate a short distance from the block.

The objective 7 is axially aligned with an aperture 18 in the base plate and a similar aperture in the shutter block 10 through which light rays pass to make an exposure. The aperture 18 is normally covered by a shutter blade 19 by which, as shown in dotted lines in Fig. 2, is an irregular shape and which is pivoted at 20 to the base plate.

The shutter blade 19 is provided with a pair of lugs 21 and 22. The former lug extends up through an arcuate cut-out 23 and the latter lug extends up through an arcuate cut-out 24 in the base plate. A spring 25 encircling the pivot 20 normally holds the shutter blade in the position shown in Fig. 2.

To make an exposure the lug 21 is engaged by an end 26 of a master member 27 pivoted at 28 to the base plate and having an end 29 adapted to be engaged and moved by the end 30 of the trigger 11 which is pivoted at 31 to the base plate.

A spring 32 furnishes the driving energy for the master member 27 and a spring 33 normally holds the trigger in the position shown in Fig. 2.

It should be noted that the master member 27 has two lugs the ends of which 26 and 34 are adapted to resiliently press on the base plate 15.

Figures 3, 6:
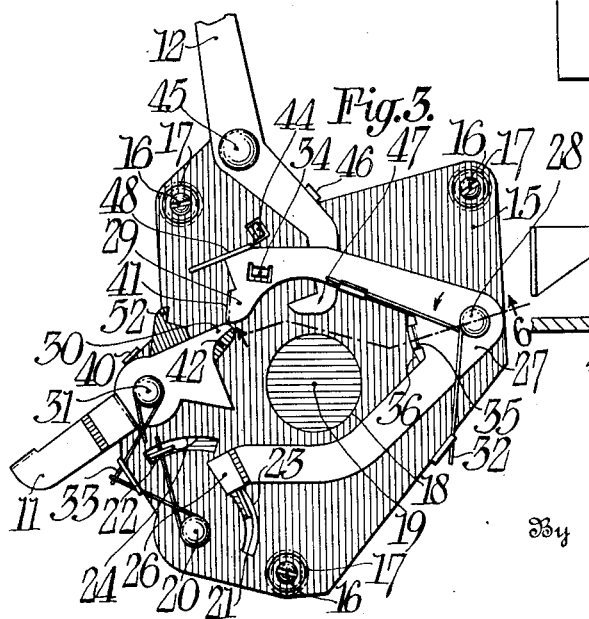

In order to secure this pressure the master member is provided with a third arm 35 which extends downwardly through the arcuate cut-out 36 in the base plate 15 having an end 37 which engages the bottom of this plate, all as shown in Fig. 6. This contact between the part 37 and the base plate 15 tends to hold the end 26 of the master member and the lug 34 of the master member down against the plate 15 although since the master member is made of resilient material the arms can spring upwardly over shutter parts as will be hereinafter more fully described.

In order to make an instantaneous exposure the trigger 11 must move the master member 27 and the master member 27 must move the shutter blade 19. These parts, as shown in Fig. 2, are normally out of engagement. However, the master member has a slip-off engagement with the trigger and the trigger has a slip-off engagement with the shutter blade by which a movement of the shutter blade is secured to produce an instantaneous exposure.

The structure which permits the slip-off engagement between the master member 27 and the trigger 11 is shown on an enlarged scale in part in Fig. 8. The trigger 11, as shown, is formed downwardly at 38 to provide a plate 39 which is pivotally mounted upon the stud 31. The spring 33 normally holds the trigger in a normal position of rest in contact with the lug 40 which is bent up from the base plate 15 is shown in Figs. 2 and 8.

In Fig. 8 the trigger has been started to make an instantaneous exposure. The point 30 of the trigger is in engagement with a downwardly extending wedge-shaped lug 41 carried on the end 34 of the master member and is starting to move the master member. This movement will continue with the trigger moving in the direction shown by the arrow and the master member being moved in the direction shown by the arrow in Fig. 8.

Since the pivots 31 and 28 are off-set from each other and since the trigger 11 and the master member 27 are pivoted on these off-set pivots the path of movement of the operating member 30 of the trigger will be as indicated in broken lines in Fig. 8 and the trigger will move the master member 27 until the latter slips off and returns rapidly to its initial position. Fig. 3 shows the position of the parts just before the slip off occurs. As will be noted from this figure the operating end 26 of the master member is sliding up over the wedge-shaped lug 21 which is carried by the shutter blade 19. As soon as the point 30 of the trigger moves to a position in which the beveled lug 41 of the master member can slip off the trigger, the master member under the impulse of its spring 32, will swing rapidly in the direction shown by the arrow in Fig. 3. This movement will cause the operating end 26 of the master member to move the shutter blade 19 until the end 26 of the master member slips off the tapered lug 21 which, as best shown in Fig. 2, is integral with the shutter blade. This makes "an instantaneous" exposure.

In returning to its initial position the trigger 11 has to raise up the master member 27 and this is accomplished in the following manner: as above explained the master member is provided with a wedge-shaped lug 41. When the master member is moved in the direction shown by the arrow in Fig. 5 a cam surface 42 engages the wedge-shaped lug 41 so that the master member arm is raised to such an extent that the lug 34 is spaced from the base plate 15 and the trigger can return to its normal position of rest against the stop 40, as indicated in Fig. 1. The cam surface 42 on the trigger 11 is clearly shown in Fig. 8.

In order to make time exposures it is necessary to hold the shutter blade in an opened position. In accordance with the present embodiment of my invention the time lever 12 is moved to T on the scale 13 in which position (as indicated in Figs. 4 and 5) a portion 43 of the lever rests against a stop lug 44, this lug being cut-out from the base plate 15. The time lever 12 is pivoted at 45 to the base plate and may move between the positions defined by the lug 44 and a second lug 46. The end 47 of the time lever is in the shape of a hook adapted, when in a time position, to lie in the path of the master member lug 34. Thus when the master member is actuated by means of the trigger 11 to move the shutter blade 19 from the aperture 18, as illustrated in Fig. 4, the master member lug 34 may become engaged with the hook 47 of the time lever.

As the movement of the trigger is continued to its utmost extent downwardly (the position illustrated in Fig. 4) the master member is held in a position in which the operative end 26 contacts with the tapered lug 21 of the shutter which extends up through the arcuate opening 23. This position, as shown in Fig. 4, holds the shutter blade 19 open. By depressing the trigger the cam surface 42 of the trigger, by engaging the tapering lug 41 of the master member, causes the master member to spring up over the hook 17. However, at the time that the hook is released by the master member, as clearly shown in Fig. 5, a second lug 48 on the master member engages a second cam 49 on the trigger, this cam serving as "a time" cam. With the cam 49 and the lug 48 in engagement, as shown in Fig. 5, the trigger cannot continue its return movement to the position shown in Fig. 2 and consequently the shutter blade 19 is retained in an open position so long as the three parts—the trigger, the master member and the shutter blade are all in engagement.

The trigger must be again depressed to permit the shutter blade to close the opening 18. When the trigger 11 is depressed the lug 48 slides down the cam 49 until the point 50 is reached at which place the master member is free to slip off. As the master member slips off the tapered lug 21, that is, when the operative end 26 of the lever swings downwardly until it passes the arc of movement of the tapered lug 21, it releases the shutter blade 19. When the trigger is again released it will return to its initial position, as shown in Fig. 2, the cam 42 camming under the wedge-shaped lug 41 of the master member.

It should be noted that the lug 48 of the master member is of a peculiar shape, having a diagonal wall 51 which is shaped so that when the trigger returns to its normal position that end of the trigger 52 which carries the cam 49 and the shoulder 50 can ride freely under the angular end 51 of the master member.

It should be noted from Fig. 7 that the angular end 52 of the master member is bent upwardly from the plate 39 which is pivoted upon the stud 31 encircled by the actuating spring 33. The cam surface 49, therefore, lies at an angle to the base plate 15 and to the normal position of the master member 27. The cam surface 42 may also lie at a slight angle to the base plate since this permits the trigger to move somewhat more smoothly than would otherwise be the case. This shape, however, is not essential except that there must be a definite relation between the cams 42 and 49 of the trigger 11 and between two lugs of the master member 27 which engage these cams, that is, the wedge shaped lug 41 and the upstanding lug 48. This relation must be such that only one lug and cam can engage at a time. The lug 41 and cam 42 as above explained engage on the return movement of the trigger after an instantaneous exposure and after the shutter has been opened for a time exposure.

The cam and lug 49 and 48 engage only after the master member has been momentarily retained by the hook 47 for time exposures and after the cam 42, by means of the lug 41, releases the master member 27 from engagement with the hook. This position is illustrated in Fig. 5 wherein the master member 27 has been cammed away from plate 15 so that lug 34 no longer lies in contact with hook 47 but the master member is held in the position shown through the engagement of the cam 49 and lug 48.

With this arrangement it will be seen that the trigger 11 not only serves as a trigger but the cam 49 and shoulder 50 serve as a part of the timing mechanism. This enables a single time lever 12 to be used and it also makes possible a shutter in which the shoulder means for compensating a time exposure remains in the trigger 11. That is to say, after the shutter blade 19 has been opened as in Figs. 4 and 5 for a time exposure movement of the lever 12 will not then complete a time exposure and permit the shutter blade 19 to cover the aperture 18 because as the master member starts to return to initial or inoperative position the lug 48 immediately engages the cam 49. This is done just as soon as the cam 42 raises the wedge-shaped lug 41 a sufficient distance to release the hook 47 and in accomplishing this movement the second set of engaging parts, the cam 49 and lug 48 are brought into engagement.

This engagement after being established by the cam 42 and lug 41 is independent of these parts since the partial return movement of the master member is prevented by lug 48 engaging cam 49 and a second downward pressure upon the trigger 11 is required to release the cam 49 and lug 48 during which movement the cam 42 moves beyond contact with the downwardly extending wedge-shaped lug 41.

By utilizing the trigger 11 for a time lever as well as a trigger the total number of parts in this shutter is reduced to a minimum. The present shutter consists of only four parts: the shutter blade, master member, trigger and time lever. Each of these parts is pivoted to a base plate and all of these parts normally lie out of engagement with each other except that a locking end of the trigger 53 may lie either close to or in engagement with lug 23 of the shutter blade 19, as illustrated in Fig. 2.

The reason for this is that with a single blade shutter having a spring to normally hold the parts in a closed position to exclude light from the camera there is always the possibility that a sudden shock or blow, caused by striking the camera, might cause the shutter blade to rebound on its pivot or to move on its pivot to a position in which the light may enter the aperture 18 accidentally. In order to assist in definitely preventing this, the trigger 11 is provided with a locking edge 53 which lies across the arcuate slot 24 in the normal path of the lever 22. The trigger is held in the position shown in Fig. 2 by means of the pressure applied by a substantial spring 33 and since the locking edge 53 lies comparatively close to the pivot 31 for the trigger, the trigger has considerable mechanical advantage over the shutter blade and forms a lock for the blade which definitely prevents accidental opening of the blade.

As a matter of fact with a shutter constructed with a blade lock as above described it is difficult to manually operate the blade 19 by pressure upon the lug 22 so that an adequate shutter blade lock is thus formed.

Of course, as soon as the trigger is depressed for either "an instantaneous" or "a time" exposure the locking edge 31 is moved away from the arcuate slot 24 and the shutter blade is free to move against the pressure of its spring 25 which, of course, returns the blade to its initial position after each slip off connection with the master member.

It will thus be seen in my improved form of shutter that the trigger has three functions, that of actuating the master member, that of holding the master member opened during time exposures and that of locking the trigger in a closed position. This is accomplished by means of a single formed-up pivoted piece of metal.

The operation of my shutter has been already fully described but in order to summarize: For an instantaneous exposure the lever 12 is moved to I on the scale 13 and the trigger 11 is depressed. The trigger, master member and shutter blade which in normal positions of rest are all out of contact are moved in succession, the master member slipping off the trigger and the blade slipping off the master member. Each of these parts is immediately returned to its normal position of rest. In this position of rest the trigger by lying across the path of a lug on the shutter blade prevents accidental movement of the shutter blade and locks it in a closed position. For time exposure the time lever is moved to T on scale 13 and the three movable parts move as before in opening the shutter blade but the master member is momentarily retained by the time lever in a position in which the second set of cam and lug engagement members on the trigger and master member become engaged, that is, lug 48 and cam 49. Thus the master member cannot return to its initial position and the shutter blade 19 is held open positively until the trigger is again depressed and the lug 48 slips off of the trigger cam 49.

While I have described a preferred embodiment of my invention to illustrate one form of shutter, it is obvious that the shape of the parts may be altered and that other changes may be made without departing from the scope of my invention. I, therefore, contemplate as within the scope of my invention all such forms as may come within the terms of the appended claims.

What I claim is:

1. In a photographic shutter for cameras, the combination with a shutter blade, of a master member and a trigger, three pivotal supports, one for each of the above recited parts and a spring tending to hold each of the parts in a normal position, the trigger being movable on the pivot and adapted to have a slip-off connection with the master member, the master member being movable by the trigger and adapted to have a slip-off connection with the shutter and means including a time lever adapted to temporarily bring into engagement all three shutter parts.

2. In a photographic shutter for cameras, the combination with a shutter blade, of a master member adapted to operate the shutter blade, and a trigger adapted to operate the master member, springs connected to the three parts and adapted to hold them in a normal position of rest in which the master member lies out of contact with the shutter blade and the trigger lies out of contact with the master member.

3. In a photographic shutter for cameras, the combination with a shutter blade, of a master member adapted to operate the shutter blade, and a trigger adapted to operate the master member, springs connected to the three parts and adapted to hold them in a normal position of rest in which the master member lies out of contact with the shutter blade and the trigger lies out of contact with the master member and a fourth member adapted to restrain the shutter blade, master member and trigger from returning to their normal out of contact position.

4. In a photographic shutter for cameras, the combination with a shutter blade, of a master member adapted to operate the shutter blade, and a trigger adapted to operate the master member, springs connected to the three parts and adapted to hold them in a normal position of rest in which the master member lies out of contact with the shutter blade and the trigger lies out of contact with the master member and a fourth member adapted to restrain the shutter blade, master member and trigger from returning to their normal out of contact position, said fourth member being adapted to engage one of the other three members in a position in which all of the three members will engage each other and will be held against the action of said springs from returning to their normal position.

5. In a photographic shutter for cameras, the combination with a shutter plate, of three cooperating shutter parts including a shutter blade, a master member, and a trigger, all pivotally mounted to said shutter plate, each of three parts adapted to move about their pivotal mounts in a path in which each one will be engaged by the other two shutter parts.

6. In a photographic shutter for cameras, the combination with a shutter plate, a plurality of pivots mounted thereon, a plurality of movable shutter parts including a shutter blade, a master member and a trigger, each mounted on one of said pivots, springs tending to turn these parts in one direction upon said pivots, whereby said shutter blade lies out of contact with said master member and said master member lies out of contact with said trigger in a normal position of rest, said trigger being operable to cause temporary engagement of the three parts for making an instantaneous exposure and a time lever for temporarily restraining the movement of the master member, whereby said movable shutter parts may be held in engagement by their springs for time exposures.

7. In a photographic shutter, the combination with a master member, of a trigger for moving the master member, a cam carried by the trigger adapted to engage the master member, a lug on the master member adapted to engage said cam, and means including a second cam on said trigger and a movable arm adapted to cooperate with said master member to position said master member lug to engage said cam.

8. In a photographic shutter, the combination with a master member, of a trigger for moving the master member, two master member engaging areas on said trigger, a lever for temporarily restraining movement of said master member for time exposures, thereby bringing one of the two master member engaging members into operative engagement with said trigger, said trigger being the sole means for releasing said master member to complete a time exposure.

9. In a photographic shutter, the combination with a master member, of a trigger adapted to move said master member, two pairs of cooperating lugs and cams on the trigger and master member so arranged that only one pair are adapted to cooperate at one time.

10. In a photographic shutter, the combination with a master member, of a trigger adapted to move said master member, two pairs of cooperating lugs and cams on the trigger and master member so arranged that a cam and lug are operatively positioned with respect to each other while said other cam and lug are inoperatively positioned.

11. In a photographic shutter, the combination with a master member, of a trigger adapted to move said master member, two pairs of cooperating lugs and cams on the trigger and master member so arranged that only one pair are adapted to cooperate at one time for making instantaneous exposures and means to alter the relative positions of the master member and trigger, whereby the other pair of cooperating lug and cam will be operatively positioned for making time exposures.

12. In a photographic shutter, the combination with a master member, of a trigger adapted to move said master member, two pairs of cooperating lugs and cams on the trigger and master member so arranged that a cam and lug are operatively positioned with respect to each other while said other cam and lug are inoperatively positioned and a lever adapted to alter the relative positions of the trigger and master member whereby the normally inoperative cam and lug will be positioned to cooperate.

13. In a shutter for photographic cameras, the combination with a pivoted trigger, of a spring tending to move the trigger in one direction, a shutter blade, a pivotal mount for the shutter blade and a spring for moving the blade into a closed position, said shutter blade having a lug against which said spring acts, said lug being positioned in the path of the trigger whereby said trigger by pressing on said lug may lock the shutter in its closed position.

14. In a shutter for photographic cameras, the combination with a pivoted trigger, of a spring tending to move the trigger in one direction, a shutter blade, a pivotal mount for the shutter blade and a spring for moving the blade into a closed position, said shutter blade having a lug against which said spring acts, said lug being positioned in the path of the trigger whereby said trigger by pressing on said lug may lock the shutter in its closed position, and a master member having an operative relation with both the trigger and the shutter blade for operating the latter by the former said spring acting on said shutter blade lug to return the blade to its closed position in which it will be locked when said spring moves said trigger in one direction.

15. In a shutter for photographic cameras, the combination with a trigger, of a master member adapted to have a slip-off engagement with the trigger, said master member comprising a two-armed lever, a pivotal support for the lever between the two arms, a slotted base plate, and means for resiliently pressing the arms of the master member against the base plate comprising a third arm carried by the master member and passing through the slotted base plate.

16. In a shutter for photographic cameras, the combination with a trigger, of a master member adapted to have a slip-off engagement with the trigger, said master member comprising a resilient two-armed lever, and a short arm carried by said lever, an arcuately slotted base plate, a pivotal support for the master member near the arcuate slot in the base plate, said short arm passing through said arcuate slot and tending to draw the resilient two arms of the master member down against said base plate.

17. In a shutter for cameras, the combination with a trigger, of a master member upon which the trigger may operate, said master member comprising a pivoted lever, a base plate, means for resiliently pressing the master member against the base plate, a time lever for restraining the movement of the master member, and two cams carried by the trigger and so positioned that one cam may move the master member from the base plate into a position in which said master member may engage said time lever, and in which the second cam carried by the trigger may engage said master member.

18. A trigger for photographic shutters including a single piece of metal having formed thereon, a time cam and a slip-off cam in fixed relation to each other.

19. A trigger for photographic shutters including a single piece of metal having formed thereon, a time cam and a slip-off cam in fixed relation to each other and a shutter blade lock spaced from the two cams.

20. A trigger for photographic shutters including three radial arms, one arm constituting a time stop, another arm a slip-off cam and the third arm a shutter blade lock, all of said parts being fixed in relation to the others.

WILLIAM A. RIDDELL.